(12) United States Patent
Krzanowski et al.

(10) Patent No.: US 8,750,117 B2
(45) Date of Patent: *Jun. 10, 2014

(54) DYNAMIC SERVICE-AWARE FLOW CONTROL IN PACKET NETWORKS

(75) Inventors: Roman M. Krzanowski, White Plains, NY (US); William A. Bjorkman, Danbury, CT (US); Haidar Chamas, White Plains, NY (US); Vincent A. Alesi, Yorktown Heights, NY (US)

(73) Assignee: Verizon Services Corp., Ashburn, VA (US)

( * ) Notice: Subject to any disclaimer, the term of this patent is extended or adjusted under 35 U.S.C. 154(b) by 215 days.

This patent is subject to a terminal disclaimer.

(21) Appl. No.: 12/869,219

(22) Filed: Aug. 26, 2010

(65) Prior Publication Data

US 2010/0325271 A1 Dec. 23, 2010

Related U.S. Application Data

(63) Continuation of application No. 11/350,029, filed on Feb. 9, 2006, now Pat. No. 7,826,364.

(51) Int. Cl.
*H04L 12/26* (2006.01)
(52) U.S. Cl.
USPC ........... 370/235; 370/229; 370/236; 709/230; 709/232

(58) Field of Classification Search
USPC .......... 370/229, 230, 231, 235, 236; 709/230, 709/232
See application file for complete search history.

(56) References Cited

U.S. PATENT DOCUMENTS

| 5,313,454 | A | 5/1994 | Bustini et al. | |
|---|---|---|---|---|
| 6,345,038 | B1* | 2/2002 | Selinger | 370/230 |
| 7,058,015 | B1 | 6/2006 | Wetherall et al. | |
| 2005/0025052 | A1* | 2/2005 | Zhao et al. | 370/230 |
| 2005/0216584 | A1* | 9/2005 | Chisholm | 709/224 |
| 2005/0220022 | A1 | 10/2005 | DelRegno et al. | |
| 2005/0282571 | A1* | 12/2005 | Oprescu-Surcobe et al. | 455/503 |
| 2006/0159016 | A1 | 7/2006 | Sagfors et al. | |
| 2007/0195694 | A1 | 8/2007 | Schutz et al. | |

* cited by examiner

*Primary Examiner* — Charles C Jiang
*Assistant Examiner* — Siming Liu (57) ABSTRACT

The present invention, including system methods and computer program product, provide the ability to control the flow of traffic into an aggregated trunk port in a network. This is performed by monitoring the trunk port of an aggregation packet switch for congestion and limiting the traffic flowing into the aggregation packet switch through virtual connections with one or more user network interfaces. An access control system executing an access control algorithm monitors the trunk port and controls the user network interfaces to limit the traffic the passes through the trunk port in the event of traffic congestion. Traffic may be limited on the basis of the class of service, the virtual connection, or other parameters.

19 Claims, 8 Drawing Sheets

Exemplary ACS-T With Entries

| Trunk Port ID | XXXXXX |
|---|---|
| Trunk Port Capacity | 1000 Mbps |
| Protected Link Capacity | 140 Mbps |
| Protected Link Buffer Queue Depth | 90 KB |
| CP_1 Gold Profile (CIR, CBS, EIR, EBS) | (8 Mbps, 10 KB, 0 Mbps, 0 KB) |
| CP_1 Silver Profile (CIR, CBS, EIR, EBS) | (10 Mbps, 50 KB, 10 Mbps, 50 KB) |
| CP_2 Gold Profile (CIR, CBS, EIR, EBS) | (30 Mbps, 10 KB, 0 Mbps, 0 KB) |
| CP_3 Silver Profile (CIR, CBS, EIR, EBS) | (40 Mbps, 50 KB, 40 Mbps, 50 KB) |
| Trunk Port Utilization for Gold class of service | 30 Mbps |
| Trunk Port Utilization for Silver class of service | 50 Mbps |
| CP_1 Gold Utilization | 5 Mbps |
| CP_1 Silver Utilization | 20 Mbps |
| CP_2 Gold Utilization | 25 Mbps |
| CP_3 Silver Utilization | 30 Mbps |

DYNAMIC SERVICE-AWARE FLOW CONTROL IN PACKET NETWORKS

CROSS REFERENCE TO RELATED APPLICATIONS

This application is a continuation of U.S. patent application Ser. No. 11/350,029, filed on Feb. 9, 2006, which is hereby incorporated by reference in its entirety.

BACKGROUND INFORMATION

The Open Systems Interconnection Model (OSI Model or just OSI) is a layered abstract description for communications and computer network protocol design. It is a hierarchical structure generally comprised of seven layers that defines the requirements for communications between two computers. The model was defined by the International Standards Organization and was conceived to allow interoperability across the various platforms offered by vendors. Each layer of the OSI Model has the property that it only uses the functions of the layer below, and only exports functionality to the layer above. The layers generally include a physical layer (Layer 1), a data link layer (Layer 2), a network layer (Layer 3), a transport layer (Layer 4), a session layer (Layer 5), a presentation layer (Layer 6), and an application layer (Layer 7).

The physical layer, or Layer 1, defines all electrical and physical specifications for devices. This includes the layout of pins, voltages, and cable specifications. Hubs and repeaters are physical-layer devices. Layer 1 networks, for example Next Generation Synchronous Optical Networks (NG-SONET), as are known in the art, are increasingly being used for transport of packet switched services. It is often desirable to use a lower speed (partial rate) transport link when connecting to a Packet Switched Network (PSN) to provide the required bandwidth at the least possible cost. An example of partial rate mapping is when Gigabit Ethernet interfaces are used on a NG SONET system (Ethernet over SONET) with an STS-3 provisioned across the SONET network, thus creating a speed mismatch condition (i.e., 1000 Mbps packet interface is mapped to 150 Mbps transport channel).

NG Add-Drop Multiplexers (ADMs), providing layer 1 transport are not typically Class of Service (CoS) aware—they also typically have limited queue sizes. While large queue sizes could help guarantee frame delivery performance, they introduce excessive delay and delay variation for premium (e.g., real-time) service classes. In addition, Layer 2 switch ports providing the connection from the PSN to the layer 1 transport network generally cannot perform the full set of traffic management functionality required (e.g., egress shaping, egress policing) to support the performance guarantees required for the enhanced service classes. As a result, when traffic from one or many PSN customers converges on one interface, it is highly probable that the layer 1 client interface will start dropping traffic indiscriminately, i.e., without regard to the priority or importance of the traffic being dropped. In such a condition, premium traffic (e.g., real-time) with strict Service Level Agreement (SLA) objectives will be dropped with the same probability as the low priority (best effort) traffic, a service class without any performance guarantees.

A common solution to this challenge is to substantially overprovision bandwidth across the Layer 1 transport system, (e.g. by mapping the packet interface bandwidth to a full-rate STS-n mapping). In the case of 1000 Mbps Gigabit Ethernet service, this equates to an STS-21 mapping at best. Needless to say, this is an expensive and inefficient solution for a customer desiring an aggregate committed information rate of only 150 Mbps.

DETAILED DESCRIPTION OF PREFERRED EMBODIMENTS

The preferred embodiments implemented according to the present invention now will be described more fully with reference to the accompanying drawings, in which some, but not all possible embodiments of the invention are shown. Indeed, this invention may be embodied in many different forms and should not be construed as limited to the embodiments set forth herein. Rather, these embodiments are provided so that this disclosure will satisfy applicable legal requirements. Like numbers refer to like elements throughout.

As will be appreciated by one skilled in the art, the preferred embodiments may be implemented as a method, a data processing system, or a computer program product. Accordingly, preferred embodiments of the present invention may take the form of an entirely hardware embodiment, an entirely software embodiment, or an embodiment combining software and hardware aspects. Furthermore, implementations of the preferred embodiments may take the form of a computer program product on a computer-readable storage medium having computer-readable program instructions (e.g., computer software) embodied in the storage medium. More particularly, implementations of the preferred embodiments may take the form of web-implemented computer software. Any suitable computer-readable storage medium may be utilized including hard disks, CD-ROMs, optical storage devices, or magnetic storage devices.

The preferred embodiments according to the present invention are described below with reference to block diagrams and flowchart illustrations of methods, apparatuses (i.e., systems) and computer program products according to an embodiment of the invention. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Overview

The preferred embodiments according to the present invention provide systems, methods and procedures for controlling the flow of traffic (data) into an aggregated trunk port. This control is performed on a at least one of a per-CoS and a per-communication path (e.g., Virtual Connection (VC)) basis. This applies to any packet switched network (PSN), such as, for example, Ethernet, Frame Relay (FR), asynchronous transfer mode (ATM) and multi-protocol label switching (MPLS), among others. In addition, it applies in Layer 1 networks utilizing Layer 2 switching, such as, for example, resilient packet ring (RPR)/IEEE 802.17 and Ethernet over SONET.

The proposed mechanism of a preferred embodiment is generally comprised of a centrally located Access Control System (ACS) with a data structure representing a set of control messages exchanged between network elements. An Access Control Algorithm (ACA) operates on the above data structures and determines and initiates the appropriate action. A communication system provides a control channel that enables flow control messages to be exchanged between the ACS and the packet switched network elements (e.g., UNI-N, Trunk Port, etc.).

Figure 1:
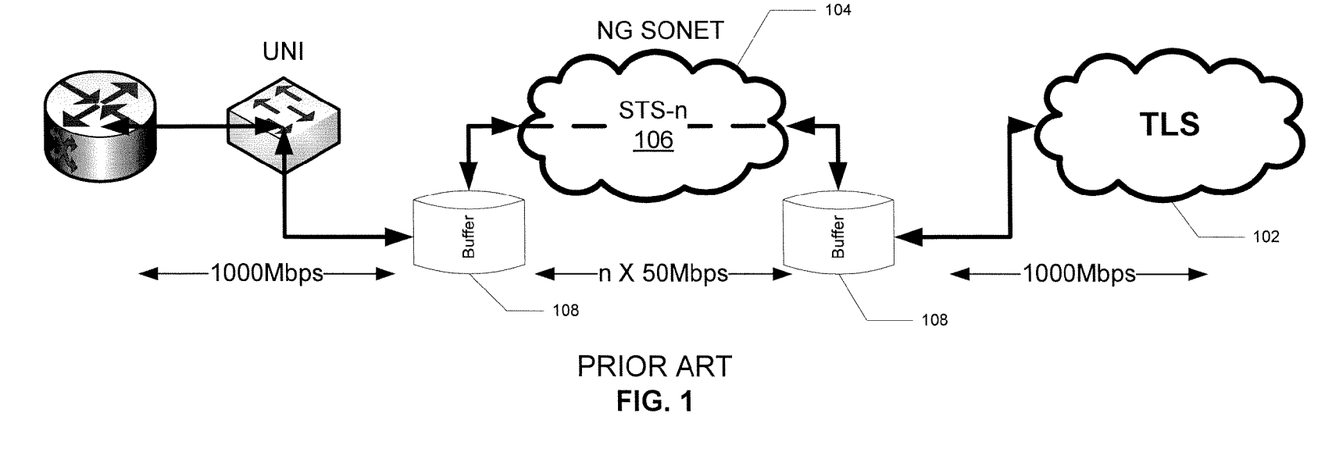
FIG. 1 is a prior art figure showing a packet switched network having converged communication paths (CPs)

For example, prior art FIG. 1 shows a packet switched network having converged communication paths (PCs). In this FIG. 1, a transparent LAN service (TLS) 102 having a signal of 1 Gbps (e.g., Gigabit Ethernet) is required to pass a signal through a NG-SONET network 104. In such an instance, full rate mapping across the NG-SONET 104 is very expensive and a typical transport rate would be approximately n×50 Mbps, where n is the synchronous transport level in use. For instance, in FIG. 1 the NG SONET has a data transfer speed of 150 Mbps using synchronous transport level 3 (STS-3) 106, thus creating a speed mismatch between the TLS 102 and the NG-SONET 104. This speed mismatch may cause service level agreement (SLA) objectives to be missed as the speed mismatch may cause data to be indiscriminately dropped without regard to the class of service (CoS). While buffering 108 may decrease or eliminate the loss of data, it also slows down the network. Therefore, the preferred embodiments implemented according to the present invention cause parameters such as CoS and SLA objectives to be considered when data is dropped or limited because of speed mismatches or other network considerations without causing a loss in available network speed.

Computer or Computing Device

Figure 2A:
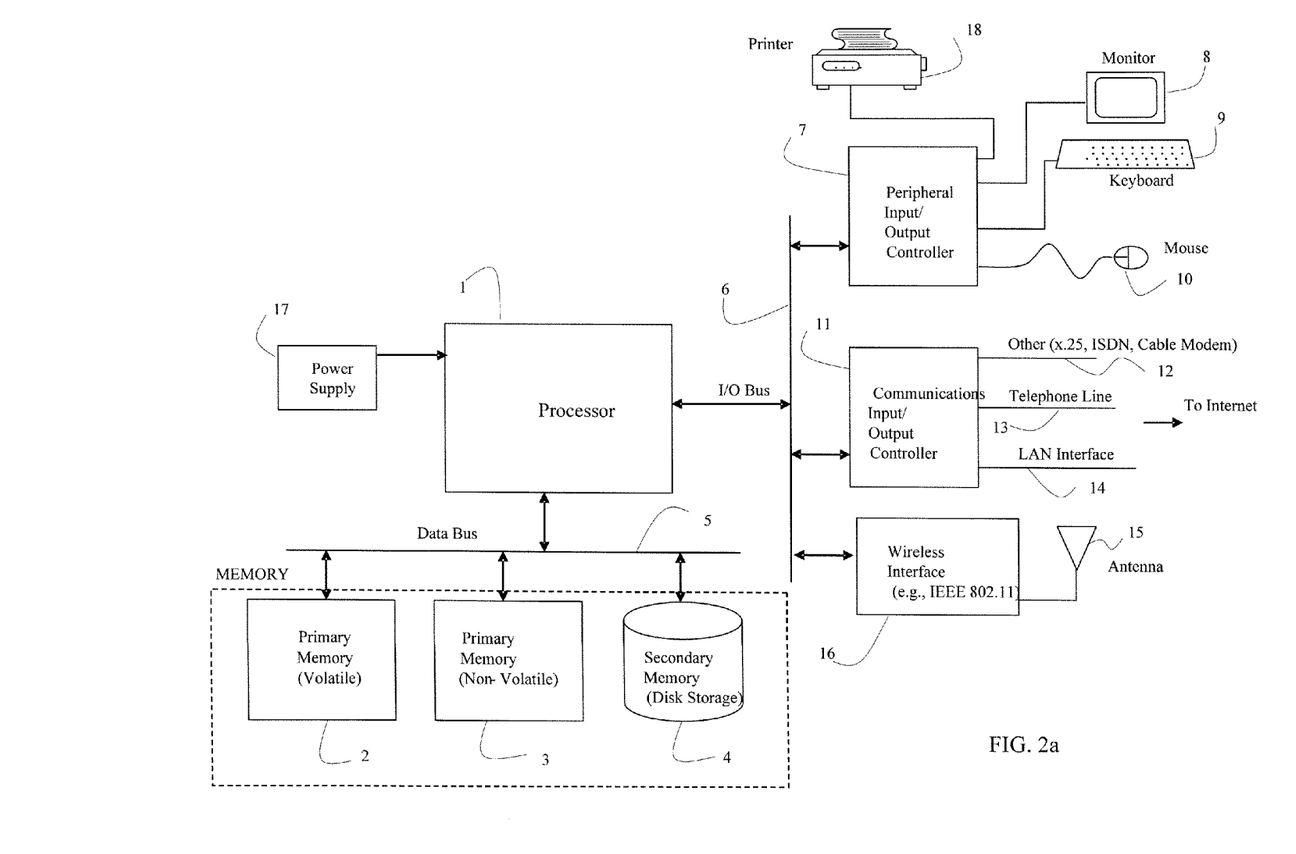
FIG. 2a is an illustration of one embodiment of a computing device that can be used to practice aspects of the present invention.

In the preferred embodiments referenced herein, a "computer" or "computing device" may referenced. Such computer may be, for example, a mainframe, desktop, notebook or laptop, a hand held device such as a data acquisition and storage device, or it may be a processing device embodied within another apparatus such as, for example, a set top box for a television system or a wireless telephone. In some instances the computer may be a "dumb" terminal used to access data or processors over a network. Turning to FIG. 2a, one embodiment of a computing device is illustrated that can be used to practice aspects of the preferred embodiment. In FIG. 2a, a processor 1, such as a microprocessor, is used to execute software instructions for carrying out the defined steps. The processor receives power from a power supply 17 that also provides power to the other components as necessary. The processor 1 communicates using a data bus 5 that is typically 16 or 32 bits wide (e.g., in parallel). The data bus 5 is used to convey data and program instructions, typically, between the processor and memory. In the present embodiment, memory can be considered primary memory 2 that is RAM or other forms which retain the contents only during operation, or it may be non-volatile 3, such as ROM, EPROM, EEPROM, FLASH, or other types of memory that retain the memory contents at all times. The memory could also be secondary memory 4, such as disk storage, that stores large amount of data. In some embodiments, the disk storage may communicate with the processor using an I/O bus 6 instead or a dedicated bus (not shown). The secondary memory may be a floppy disk, hard disk, compact disk, DVD, or any other type of mass storage type known to those skilled in the computer arts.

The processor 1 also communicates with various peripherals or external devices using an I/O bus 6. In the present embodiment, a peripheral I/O controller 7 is used to provide standard interfaces, such as RS-232, RS422, DIN, USB, or other interfaces as appropriate to interface various input/output devices. Typical input/output devices include local printers 18, a monitor 8, a keyboard 9, and a mouse 10 or other typical pointing devices (e.g., rollerball, trackpad, joystick, etc.).

The processor 1 typically also communicates using a communications I/O controller 11 with external communication networks, and may use a variety of interfaces such as data communication oriented protocols 12 such as X.25, ISDN, DSL, cable modems, etc. The communications controller 11 may also incorporate a modem (not shown) for interfacing and communicating with a standard telephone line 13. Finally, the communications I/O controller may incorporate an Ethernet interface 14 for communicating over a LAN. Any of these interfaces may be used to access a wide area network such as the Internet, intranets, LANs, or other data communication facilities.

Finally, the processor 1 may communicate with a wireless interface 16 that is operatively connected to an antenna 15 for communicating wirelessly with another device, using for example, one of the IEEE 802.11 protocols, 802.15.4 protocol, or a standard 3G wireless telecommunications protocols, such as CDMA2000 1x EV-DO, GPRS, W-CDMA, or other protocol.

Figure 2B:
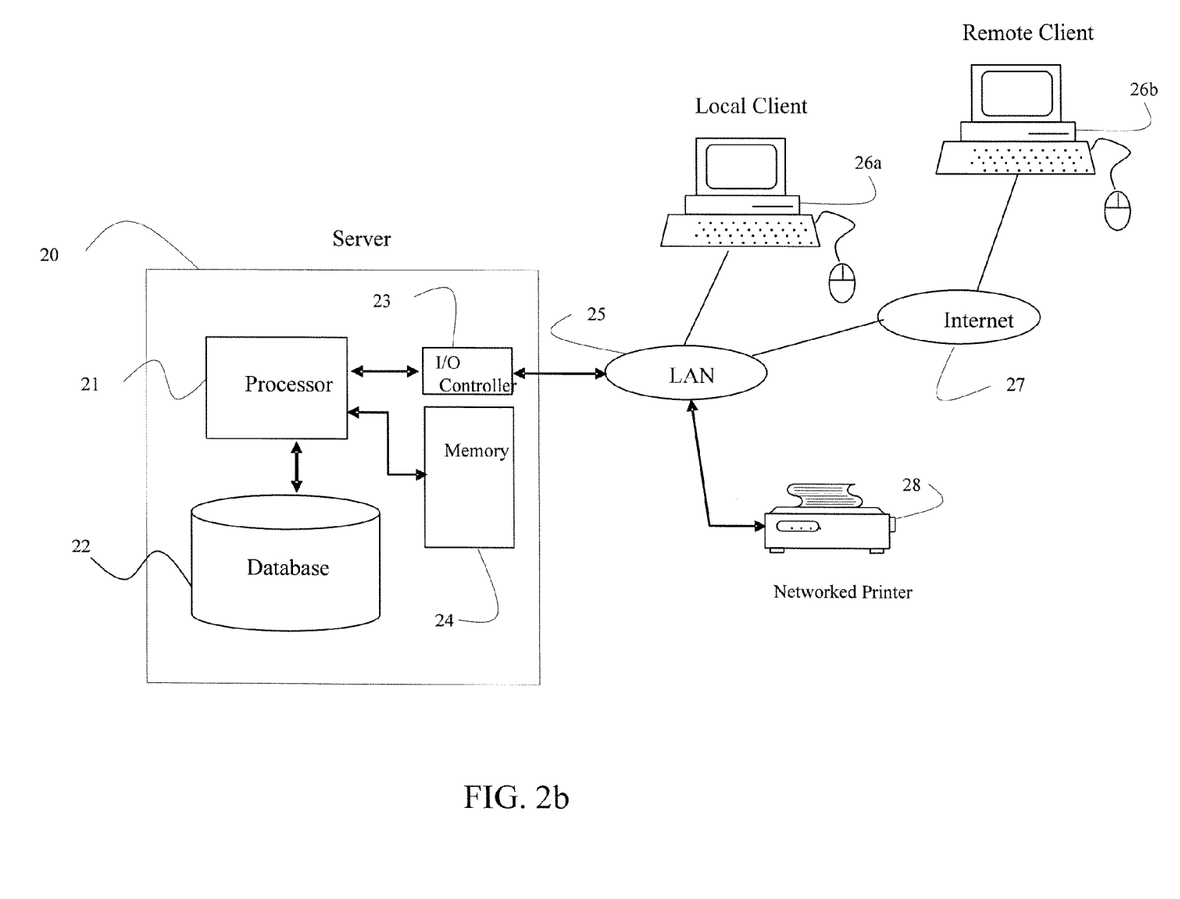
FIG. 2b is an embodiment of a processing system having a distributed communication and processing architecture that may be used to practice aspects of the present invention.

An alternative embodiment of a processing system that may be used is shown in FIG. 2b. In this embodiment, a distributed communication and processing architecture is shown involving a server 20 communicating with either a local client computer 26a or a remote client computer 26b. The server 20 typically comprises a processor 21 that communicates with a database 22, which can be viewed as a form of secondary memory, as well as primary memory 24. The processor also communicates with external devices using an I/O controller 23 that typically interfaces with a LAN 25. The LAN may provide local connectivity to a networked printer 28 and the local client computer 26a. These may be located in the same facility as the server, though not necessarily in the same room. Communication with remote devices typically is accomplished by routing data from the LAN 25 over a communications facility to a wide area network 27, such as the Internet. A remote client computer 26b may execute a web browser, so that the remote client 26b may interact with the server as required by transmitted data through the Internet 27, over the LAN 25, and to the server 20.

Those skilled in the art of data networking will realize that many other alternatives and architectures are possible and can be used to practice the preferred embodiments. The embodiments illustrated in FIGS. 2a and 2b can be modified in different ways and be within the scope of the present invention as claimed.

System Architecture

Figure 3:
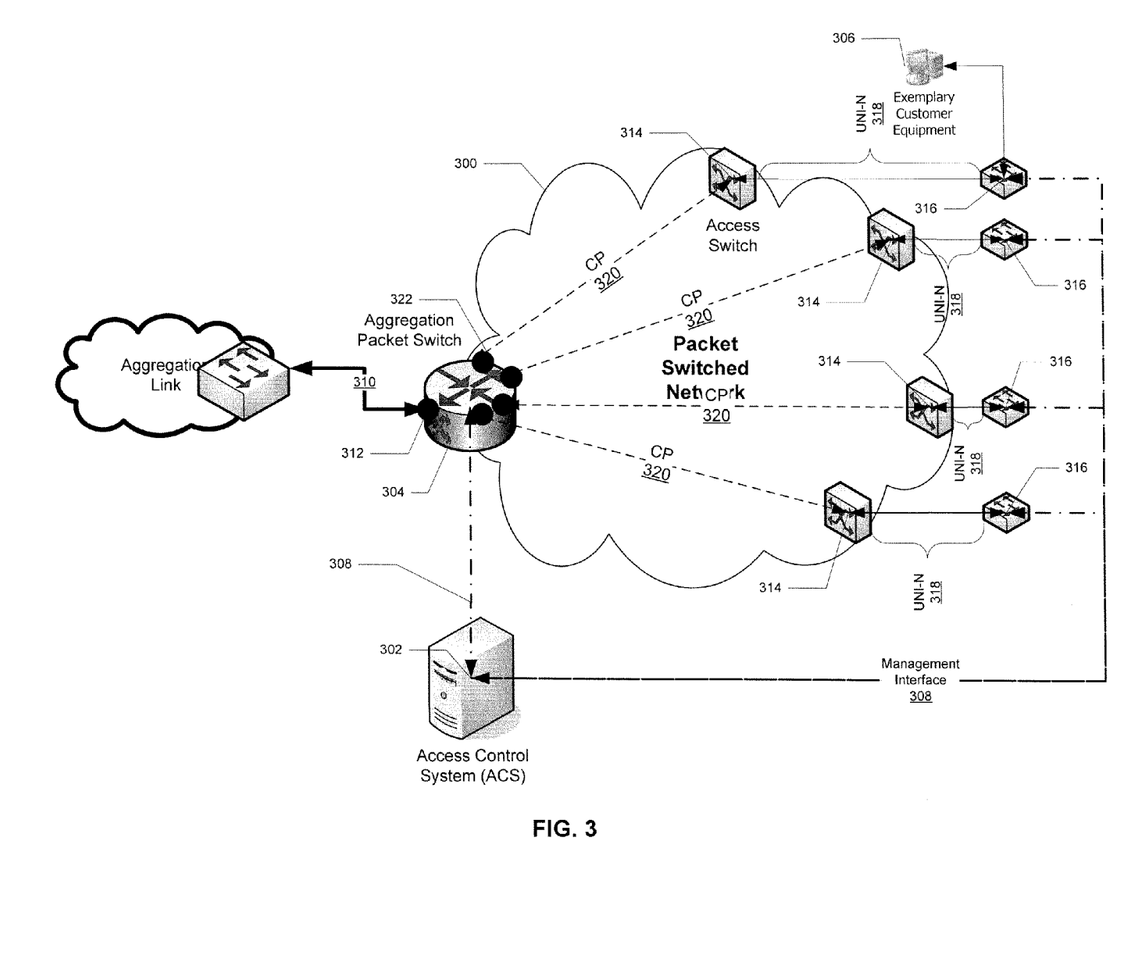
FIG. 3 is an illustration of an exemplary logical network architecture that may be used to practice one or more preferred embodiments that may be implemented according to the present invention.

A preferred embodiment of logical architecture for implementing this mechanism is shown in FIG. 3. In this embodiment a service provider (SP) controls a packet switched network 300 for transporting data. Certain data being transported have a class of service (CoS), which is a set of service packets that have a commitment from the SP to receive a particular level of performance. The system of FIG. 3 is comprised of an access control system (ACS) 302, an aggregation packet switch 304, customer equipment (CE) 306, a management interface 308, a protected link 310, a trunk port (TP) 312; one or more network ports 322; one or more of user-to-network interfaces (UNIs) 314, UNIs-Customer (UNI-C) 316, UNIs-Network (UNI-N) 318; and communications paths (CPs) 320.

The ACS 302 is a software agent that may be located outside of the PSN 300. The ACS 302 is connected to the elements of the PSN 300 over the dedicated management network using standard network management interfaces 308. The aggregation packet switch 304 is a packet switch with a trunk port 312 requiring congestion management and one or more network ports 322. The CE 306 is customer equipment connecting to the packet switched network 300. The CE 306 is network dependent. It can be, for example, a router or a switch. The management interface 308 provides an interface between the ACS 302 and network elements used for carrying congestion control messages. The PSN 300 is a Layer 2 or Layer 3 network supporting packet switched services. The protected link 310 is an oversubscribed link requiring congestion management. The trunk port (TP) 312 is a port that aggregates traffic in the PSN 300. The trunk port 312 is connected to the protected link 310. Each CP 320 connects with the aggregation packet switch 304 through a network port 322 such that the CPs 320 are logically aggregated at the trunk port 312.

Each UNI 314 is a demarcation point between the responsibility of the service provider and the customer, each UNI-C 316 is a port on the customer equipment connecting directly to the UNI 314, and each UNI-N 318 is the functionality on the packet switched network element that provides the physical interface to the UNI 314 and service processing for the customer. The UNI-N 318 has data and management plane functionality that supports congestion management via the dynamic configuration of CoS policies per CP 320. Each communication path (CP) 320 transports customer traffic and in one embodiment may be a logical connection that is a virtual connection, though other communication paths are contemplated within the scope of this invention.

System Operations

Referring again to FIG. 3, the Customer Equipment (CE) 306 sends traffic having a given Class of Service (CoS) on a given communication path (CP) 320 across its respective ingress UNI 314 to the trunk port 312 on the aggregation packet switch 304. The trunk port 312 is over-provisioned with respect to the bandwidth of all CPs 320 aggregated at this port 312. The system proposed in a preferred embodiment implemented according to this invention monitors the status of the trunk port 312 in the aggregation packet switch 304. When a certain threshold value is reached (the threshold value depends on the type of the trunk port, the aggregation switch, and the packet network technology), an access control algorithm (ACA) executing on the ACS 302 selects one or more CPs 320 with the largest amount of the unprotected traffic (typically starting with the lowest priority CoS) and sends a message (a policing message) to the respective UNI-N 318 to police this class of traffic on this CP(s) 320 to a new lower level.

After this policing message is sent, the ACA requests the status updates from all UNI-N 318 and the trunk port 312. If the congestion condition is still detected, the ACA repeats the steps resulting in the policing of traffic through the UNI-N 318. Once the congestion condition on the trunk port 312 is no longer detected, and after waiting a specific amount of time (that is implementation dependent), the ACA starts reversing the policing process by reinstating the original CoS policies on UNI-Ns 318 that have been changed from their original status. The process of the reinstating CoS policies is implementation dependent.

Logical System Architecture

Figure 4:
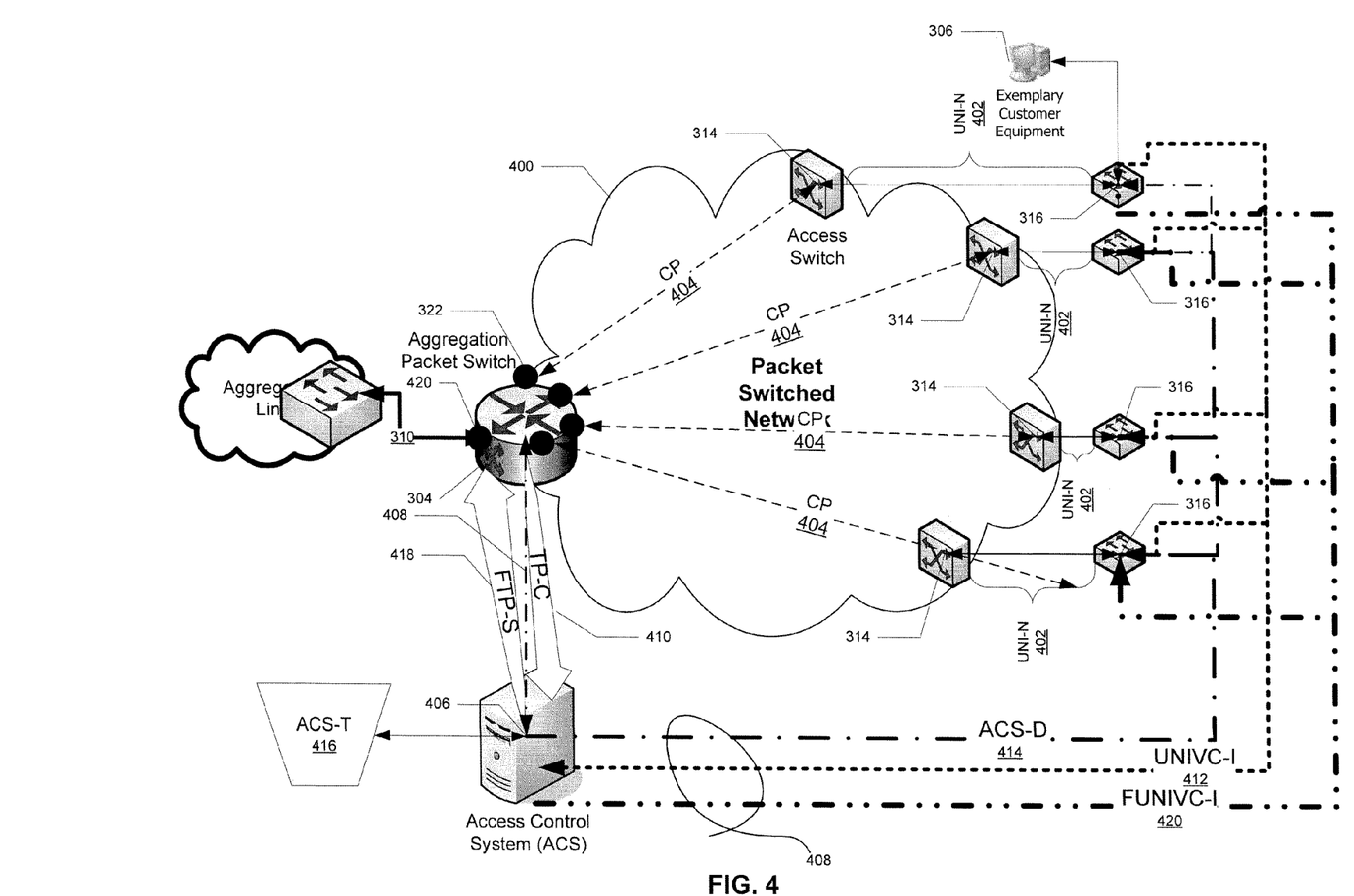
FIG. 4 is a logical view of a preferred embodiment of the proposed system that may be implemented according to the present invention.

FIG. 4 is a logical view of an embodiment of the proposed system of the present invention. The system is comprised of a packet switched network (PSN) 400 having multiple UNI-N interfaces 402. Each interface 402 is connected to a trunk port 420 over a dedicated CP 404. The CP 404 is realized by the specific protocols of the PSN such as, for example, Ethernet and its extensions such as IEEE Standard 802.1 Q, which define the operation of Virtual LAN (VLAN) bridges that permit the definition, operation and administration of VLAN topologies within a bridged LAN infrastructure. Network interfaces (which includes UNI-N 402 and the trunk port 420) are connected to a central ACS 406 via a management network 408. The management network (MN) 408 is a data network that provides connectivity between the network elements and network elements management systems (EMS) specifically, and network management systems (NMS) in general. The MN 408 is comprised of network elements (such as routers, switches, etc.), connections and work stations hosting the management systems (EMS, NMS). It is essentially an IP network (Layer 3) over some Layer 2 transport (can be Ethernet, FR, or ATM). In one embodiment, the MN 408 is used to only carry management traffic and is physically separated from the data network carrying the data traffic. The ACS 406 communicates with interfaces over the management network 408, sending appropriate types of messages as described in more detail, below.

Messages and Data Structures

Referring to FIG. 4, a Trunk Port Control Message (TP-C) 410 is a message from the trunk port 420 to the ACS 406. This message transmits the status of the interface, which is provided (pushed or pulled) on a periodic basis. The TP-C message 410 contains information about the current traffic load on the trunk port 420 for each CoS. The frequency with which the TP-C 410 is pushed/pulled depends on the type of packet network and the interface. The message format and transport encapsulation are implementation dependent. Information provided in the TP-C message 410 may include, for example, a trunk port identifier, trunk port utilization (bytes transmitted) per class of service, and a time stamp. The transmission frequency of TP-C messages 410 may range from tens of milliseconds to seconds.

A UNIVC Interface Status Message (UNIVC-I) 412 is a message to the ACS 406 from a given UNI-N 402. This message 412 transmits the bandwidth per CoS on the CP 404. The frequency with which UNIVC-I 412 is pushed/pulled depends on the UNI-N bandwidth. The message format and transport encapsulation on the UNIVC-I message 412 are implementation dependent. Information provided in the UNIVC-I message 412 may include, for example, a UNI identifier, CP utilization (bytes transmitted) per class of service, and a time stamp. The transmission frequency of the UNIVC-I messages 412 may range from tens of milliseconds to seconds.

An ACS Control Message (ACS-D) 414 is a message from the ACS 406 to the UNI-N 402. This message 414 is a request to the UNI-N 402 to limit the bandwidth allowed on a specific CoS on a given CP 404 by changing certain traffic policing parameters. The choice of the specific traffic policing parameter(s) to change is implementation dependent. Traffic policing parameters that may be adjusted include, for example, committed information rate (CIR), committed burst size (CBS), excess information rate (EIR) and excess burst size (EBS).

Figure 4A:
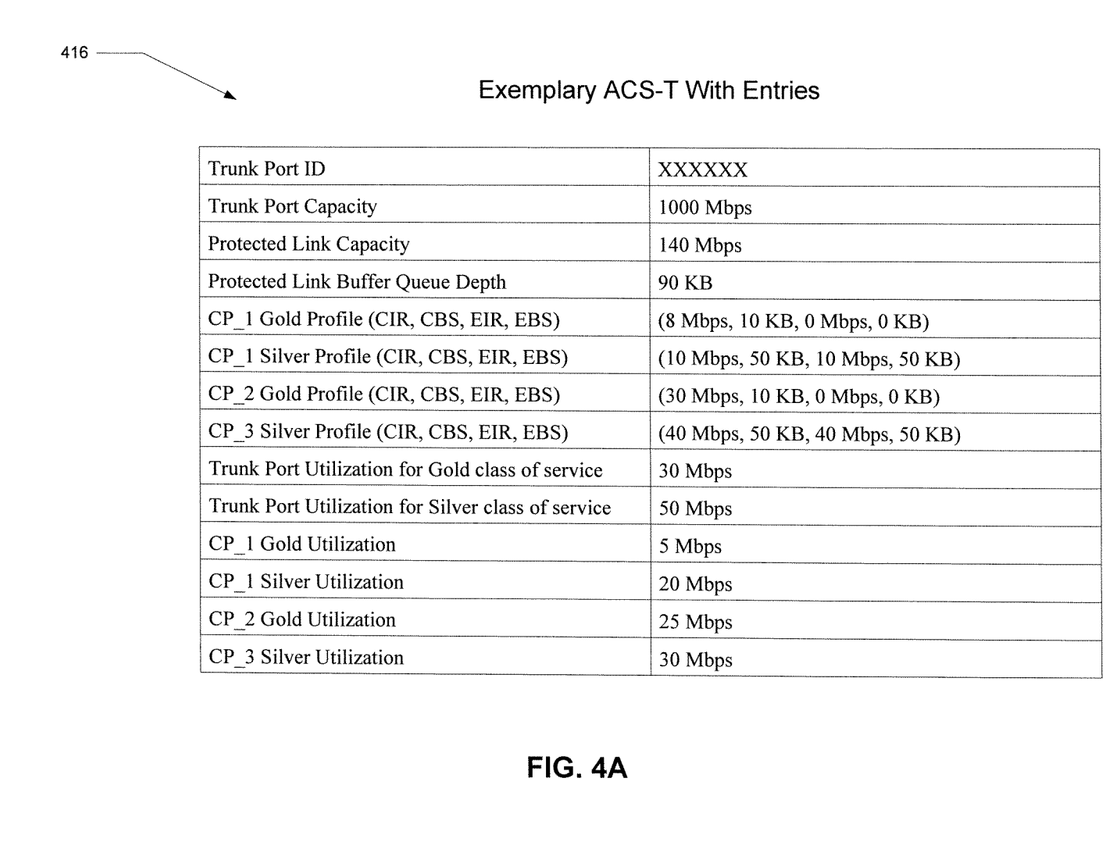
FIG. 4A illustrates a preferred embodiment of an ACS decision table with entries that may be implemented according to the present invention.

An ACS decision table (ACS-T) 416 is at least partially stored in memory associated with the ACS 406. The ACS-T 406 contains the current status of each UNI-N 402 based on the UNIVC-I messages 412. The ACS-T 416 is updated every time the ACS 406 receives a UNIVC-I message 412. The current status of each UNI-N 402 includes the current bandwidth on this interface in each CoS for each CP 404. FIG. 4A illustrates an exemplary ACS decision table 416 with entries that may be used in embodiments according to the invention. The ACS-T 416 of FIG. 4A is complete with exemplary entries.

A Forced Trunk Port Status (FTP-S) message 418 is sent from the ACS 406 to the trunk port 420 to get the current status of the interface. In response to the FTP-S message 418, the trunk port 420 will send a TP-C message. 410 The message format and transport encapsulation are implementation dependent. Information provided in the FTP-S message 418 includes, for example, a trunk port identifier and a TP-C request code.

A Forced VC Interface Status (FUNIVC-I) message 420 is sent from the ACS 406 to the UNI-N 402 to get the current status of the interface. In response to the message, the UNI-N 402 will send a UNIVC-I message 412 to the ACS 406. The message format and transport encapsulation are implementation dependent. Information provided in the FUNIVC-I message 420 includes, for example, a UNI identifier, a CP identifier and a UNIVC-I request code.

Access Control Algorithm (ACA)

As described herein, the ACS is controlled at least in part by an access control algorithm (ACA) executing on the ACS 406 (e.g., stored in the memory of the ACS 406 and executed by the processing facilities of the ACS 206). The ACA is provided with the initial configuration of the trunk port 420 and each of the UNI-Ns 402. The properties of these interfaces (buffers, policies) are also provided. Through the provisioning process, the ACA becomes aware of what UNI-Ns 402 are associated with a given trunk port.

The ACA maintains the current status (total bandwidth, per CoS bandwidth, etc.) of each UNI-N 402 interface via UNIVC-I messages 412 pushed/pulled from a given UNI-N 402, for example, at a specified time interval. The status of the trunk interface is also maintained through TP-C messages 410 pushed/pulled from the trunk port, for example, at a given time interval. The current status of all UNI-Ns 402 and trunk ports 420 is maintained in the ACS-T table 416. If the ACA detects the congestion condition on a trunk port 420, then the process illustrated in the flowchart of FIG. 5 is implemented.

Figure 5:
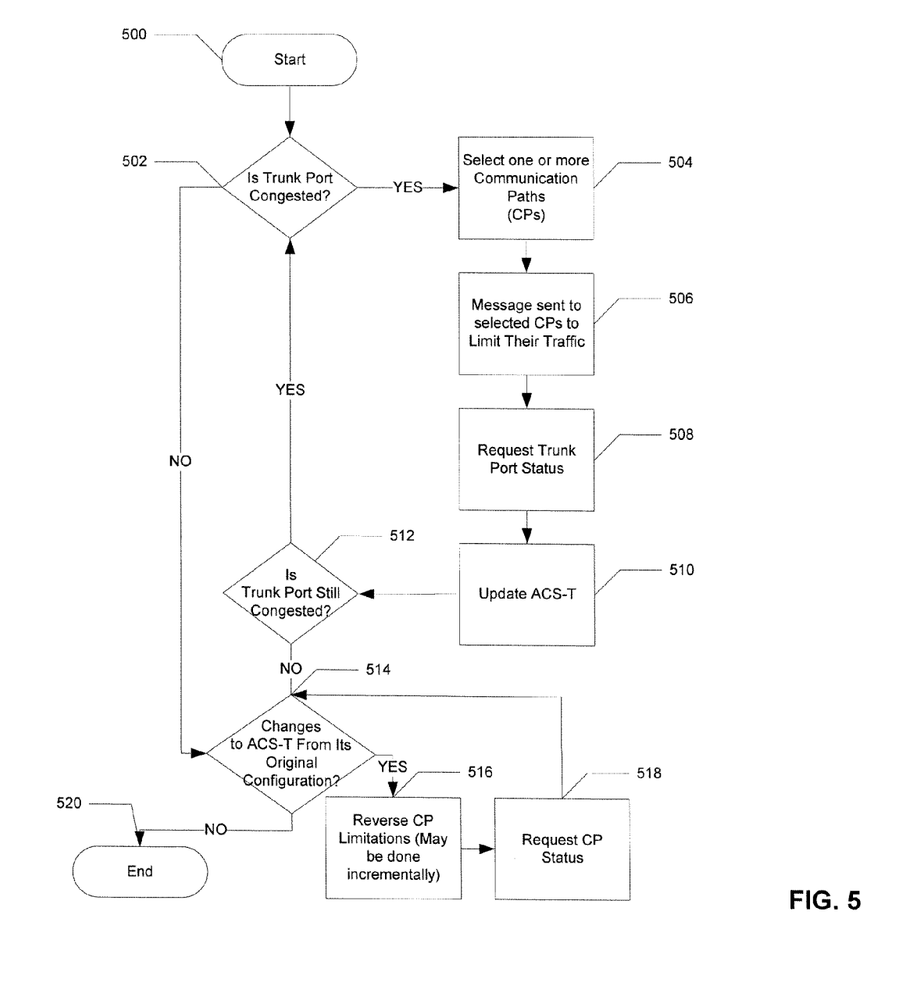
FIG. 5 is a preferred embodiment of an access control algorithm implementing dynamic flow control according to the present invention.

FIG. 5 is an embodiment of an access control algorithm implementing dynamic flow control. The process of FIG. 5 begins at Step 500. At Step 502, it is determined whether the trunk port is congested. To determine whether a trunk port is congested, the sum of trunk port utilizations per class of service is compared to the capacity of the protected link.

If the trunk port is congested, then at Step 504, the ACA selects one or more CPs' UNI-N with the largest amount of traffic. In one embodiment the ACA may consider traffic in the lowest CoS class and take into account the level of importance of the CP (e.g., two CPs in the same CoS could have different levels of importance) assigned during the provisioning process when determining the traffic to limit. At Step 506, the ACA sends a message to the interfaces of the selected one or more CPs to police them in the specific CoS class to a specified amount of traffic on a specific CP. The decision may be taken to police one or more than one UNI-Ns. At Step 508, the ACA sends the request (e.g., using a FUNIVC-I message) to the policed UNI-Ns, and the request TP-C message to the trunk port requiring protection from congestion.

After receiving the reply messages from these interfaces, the process continues to Step 510 where the ACA updates the status of ACS-T to reflect any changes made to the UNIs controlling the CPs. The process then goes to Step 512 where it reevaluates the congestion at the trunk port. If, at Step 512, the trunk port is still congested, then the process returns to Step 502 and Steps 504, 506, 508 and 510 are repeated. If, at Step 512, no congestion is detected, then the ACA checks if there were any changes to UNI-Ns by referencing the ACS-T at Step 514. If any changes are found, the ACA starts the sequence of reversing changes by going to Step 516 to set the UNI-N back to it original configuration through Steps 516 and 518, as described below. Changes may be incrementally reversed so that the trunk port will not become congested once again.

Returning to Step 502, if at Step 502 no congestion is found, then the process goes to Step 514. At Step 514 it is determined whether any recent changes have occurred to the CPs by referencing the ACS-T. If there have been changes, then the process, as described above, goes to Step 516 where the recent CP changes are reversed or incrementally relaxed. At Step 518, the status of the CPs is determined. The process then returns to Step 514 where it is again determined if the UNI-Ns were changed in the ACS-T. If any changes are found, the ACA repeats the sequence of reversing changes by going to Step 516 to set the UNI-N back to it original configuration through Steps 516 and 518. If no changes to the UNI-Ns are found, then the process goes to Step 520, where it ends. This process may execute on a continual loop on the ACS to monitor the status of the trunk port and relieve congestion conditions.

In FIG. 5, the decision when the trunk port is declared congested and how the UNI-N, CP, and CoS channels are policed is implementation dependent. The congestion may be declared at specific threshold with or without consideration of buffers at the trunk port. The decision as to how often the status of the interface is communicated to the ACS is also implementation dependent. Furthermore, the decision how the changes to the UNI-Ns are reversed is implementation dependent. The reverse changes to the UNI-N may be implemented in several steps or in all UNI-Ns at the same time.

Figure 6:
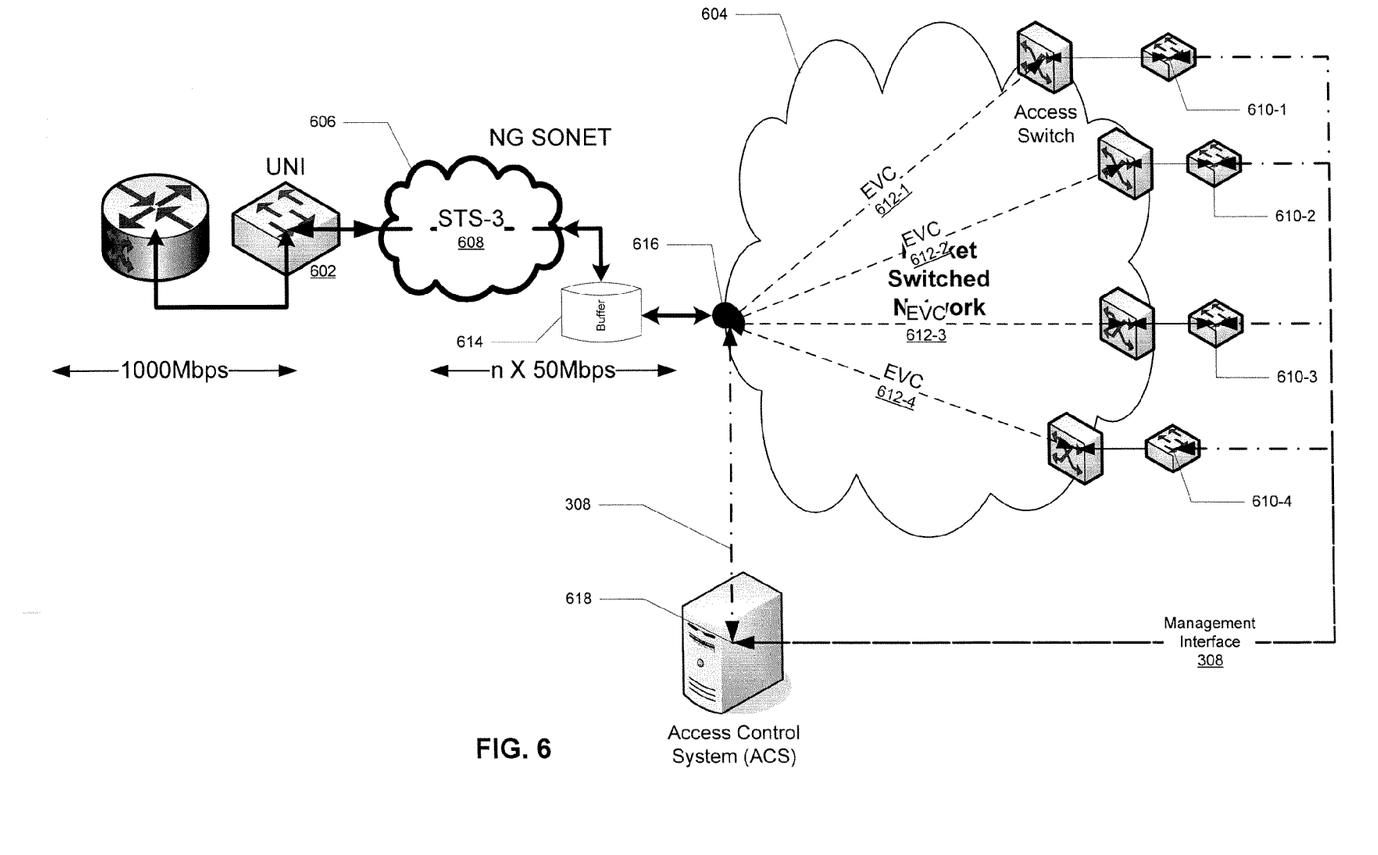
FIG. 6 is an exemplary implementation of a preferred embodiment illustrating access to a Next Generation SONET interface that may be implemented according to the present invention.

Referring to FIG. 6, which illustrates one possible implementation example, a customer application uses a switched Ethernet service to provide connectivity among five different sites. A Headquarters UNI (UNI-HQ) 602 is Gigabit Ethernet (1000 Mbps) that connects to a Layer 2 PSN 604 via a Layer 1, Next Gen SONET network 606 utilizing an STS-3 (150 Mbps) channel 608 within the Layer 1 network 606 for transporting the Ethernet service traffic. In this exemplary embodiment, the four branch sites connect to the UNI-HQ 602 using point-to-point Ethernet Virtual Connections (EVCs) 612 over the PSN 604, though other communication paths are contemplated within the scope of this invention. Each of these branch sites include branch UNIs 610 (100 Mbps each), which may use a variety of access methods (the actual access method used at these sites is not important in this example).

To more fully characterize this exemplary application, assume that each EVC 612 is provisioned at the PSN 604 with the following Classes of Service (CoS): Real-time: committed information rate (CIR)=10 Mbps; Priority Data: CIR=20 Mbps, excess information rate (EIR)=20 Mbps; and Best effort: EIR=100 Mbps As can be seen from the above, the aggregate CIR is equal to 150 Mbps (5 branch sites sending 30 Mbps each), but the total aggregate bandwidth at any given point in time could approach 500 Mbps (5 branch UNIs connected at 100 Mbps each). In this example, the Gigabit Ethernet interface on the ADM connecting the NG SONET network 606 to the PSN 604 has a single ingress queue 614 of limited size and is not CoS aware.

When traffic from the five branch sites converge on the trunk port 616, it is highly probable that at many times during the day, the Ethernet port on the ADM will drop traffic indiscriminately, (i.e. without regard to Class of Service). In such a scenario, premium traffic with the strict SLAs will be dropped with the same probability as the low priority traffic. SLA objectives would be impossible to meet. The only viable solution today is to substantially overprovision the Layer 1 network 606. In this example, an STS-12 (600 Mbps) would likely be required. Needless to say, this solution is expensive. From FIG. 6 it should be obvious that such a situation when the premium guaranteed traffic is dropped indiscriminately has to be avoided.

To further elaborate the example, at a given point in time assume that branch UNIs 610 are well behaved, sending an aggregate flow of 120 Mbps to the UNI-HQ 602, including real-time and priority traffic. Also assume that one branch UNI (UNI 610-4) is not so well-behaved, sending 100 Mbps of best-effort traffic to UNI-HQ 602. The total of 220 Mbps of aggregate flow to the ADM would clearly result in many lost packets, given the provisioning of a 150 Mbps channel 606 in the Layer 1 network 606. In this example, a solution would allow the service to be provisioned using an STS-3 transport channel in the Layer 1 network. As described herein, the Access Control System (ACS) 618 provides a solution. The ACS 618 receives traffic utilization from the trunk port 616, it evaluates and makes a decision using the ACA described earlier. When the predefined utilization level is exceeded, the ACS 618 sends a message to re-configure the policer at branch UNI 610-4 to EIR=30 Mbps. The ACS 618 then learns when the congestion situation is alleviated, and then re-configures the policer at branch UNI 610-4 to allow the full EIR=100 Mbps.

In this manner, ACS 618 provides for guaranteed performance for the enhanced Classes of Service, while minimizing the capacity requirements in the Layer 1 network 606, resulting in decreased cost to the customer.

Modifications and Alternative Embodiments

Many modifications and other embodiments of the invention will come to mind to one skilled in the art to which this invention pertains having the benefit of the teachings presented in the foregoing descriptions. For instance, traffic variables other than class of service may be used to determine traffic to be limited or the ACS may provide a notice to customers that traffic will be limited for their class of service and allow them the opportunity to voluntarily decrease traffic. Accordingly, it should be understood that the invention is not to be limited to the specific embodiments disclosed and that modifications and other embodiments are intended to be included within the scope of the appended exemplary inventive concepts. Although specific terms are employed herein, they are used in a generic and descriptive sense only and not for purposes of limitation.

That which is claimed:

1. A system, comprising:
    a plurality of user-to-network interfaces located at an edge of a network, each user-to-network interface configured to receive data traffic and transmit at least a subset of the data traffic through one of a plurality of communication paths, each communication path connecting one of the plurality of user-to-network interfaces through the network to an aggregation packet switch, the data traffic being of a plurality of classes of service;
    the aggregation packet switch that includes a trunk port and a plurality of network ports, each network port connected to one of the plurality of communication paths and configured to receive the data traffic transmitted through that connected communication path, said aggregation packet switch being configured to aggregate data traffic received by each network port from the plurality of communication paths onto the trunk port; and
    an access control system configured to monitor the trunk port for data traffic congestion, and when a certain data traffic threshold value is reached:
        select one of the plurality of communication paths transmitting data traffic having a particular class of service of the plurality of classes of service; and
        send a message to a respective user-to-network interface associated with the selected communication path that instructs that respective user-to-network interface to limit transmissions of data traffic of the particular class of service on the selected communication path to a lower amount of data traffic.

2. The system of claim 1, wherein each of the plurality of classes of service is associated with a data priority, and the particular class of service being limited is the one of the plurality of classes of service having the lowest data priority.

3. The system of claim 1, wherein the access control system is configured to select the one of the communication paths carrying data traffic having the particular class of service further based on at least one of an importance of the selected communication path and an amount of data traffic transmitted over the selected communication path.

4. The system of claim 1, wherein the one of the plurality of communication paths transmits data traffic of at least two of the plurality of classes of service.

5. The system of claim 1, wherein said access control system is further configured to determine if the data traffic threshold value is still detected to be exceeded and if so:
   select at least one additional communication path of the plurality of communication paths; and
   send a second message to a respective user-to-network interface associated with the selected additional communication path that instructs that respective user-to-network interface to limit transmissions of data traffic on the selected additional communication path to a lower amount of data traffic.

6. The system of claim 1, wherein said access control system is further configured to continue to monitor the data traffic on the trunk port and if the data traffic threshold value is no longer exceeded, send a second message to the respective user-to-network interface associated with the selected communication path that instructs that respective user-to-network interface to increase allowable data traffic on the selected communication path, and
   wherein the allowable data traffic is increased based on a class of service of the data traffic.

7. The system of claim 1, wherein at least a subset of the plurality of communication paths are virtual connection paths, and wherein the network is a packet switched network.

8. The system of claim 1, further comprising a management interface configured to carry management traffic and connected to the access control system, the aggregation packet switch, and the plurality of user-to-network interfaces, wherein the message is sent via the management interface to the respective user-to-network interface.

9. A method, comprising:
   monitoring data traffic of a plurality of classes of service processed by a trunk port of an aggregation packet switch, the data traffic being received from a plurality of user-to-network interfaces located at an edge of a network, each user-to-network interfaces connected to the aggregation packet switch through a network via one of a plurality communication paths;
   detecting congestion of the trunk port, including determining whether the data traffic processed by the trunk port exceeds a threshold value;
   selecting from the plurality of communication paths a communication path that is transmitting data traffic having a particular class of service of the plurality of classes of service; and
   sending a message to a respective user-to-network interface associated with the selected communication path that instructs that respective user-to-network interface to limit transmissions of the data traffic of the particular class of service on the selected communication path to a lower amount of data traffic.

10. The method of claim 9, further comprising selecting from the plurality of communication paths the communication path that is transmitting data traffic having the particular class of service further based on at least one of an importance of the selected communication path and an amount of data traffic transmitted over the selected communication path.

11. The method of claim 9, further comprising re-evaluating whether said trunk port is still experiencing data traffic congestion and, if so:
   selecting at least one additional communication path of the plurality of communication paths; and
   sending a second message to a respective user-to-network interface associated with the selected additional communication path that instructs that respective user-to-network interface to limit transmissions of data traffic on the selected additional communication path to a lower amount of data traffic.

12. The method of claim 11, wherein selecting at least one additional communication path is based at least in part on which of the plurality of communication paths transmits the largest amount of data traffic having a second class of service of the plurality of classes of service.

13. The method of claim 9, further comprising re-evaluating whether said trunk port is still experiencing data traffic congestion and, if not, sending a second message to the respective user-to-network interface associated with the selected communication path that instructs that respective user-to-network interface to reverse the limitation on transmission of data traffic of the particular class of service on the selected communication path.

14. A non-transitory computer-readable medium storing instructions executable by a processor and configured to cause the processor to:
   monitor data traffic of a plurality of classes of service processed by a trunk port of an aggregation packet switch, the data traffic being received from a plurality of user-to-network interfaces located at an edge of a network, each user-to-network interfaces connected to the aggregation packet switch through a network via one of a plurality communication paths;
   detect congestion of the trunk port, including determining whether the data traffic processed by the trunk port exceeds a threshold value;
   select from the plurality of communication paths a communication path that is transmitting data traffic having a particular class of service of the plurality of classes of service; and
   send a message to a respective user-to-network interface associated with the selected communication path that instructs that respective user-to-network interface to limit transmissions of the data traffic of the particular class of service on the selected communication path to a lower amount of data traffic.

15. The computer-readable medium of claim 14, further comprising instructions configured to cause the processor to select from the plurality of communication paths the communication path that is transmitting data traffic having the particular class of service further based on at least one of an importance of the selected communication path and an amount of data traffic transmitted over the selected communication path.

16. The computer-readable medium of claim 14, further comprising instructions configured to cause the processor to re-evaluate whether the trunk port is still experiencing data traffic congestion and, if so:
   select at least one additional communication path of the plurality of communication paths; and
   send a second message to a respective user-to-network interface associated with the selected additional communication path that instructs that respective user-to-network interface to limit transmissions of data traffic on the selected additional communication path to a lower amount of data traffic.

17. The computer-readable medium of claim 16, wherein selecting at least one additional communication path is based at least in part on which of the plurality of communication paths transmits the largest amount of data traffic having a second class of service of the plurality of classes of service.

18. The computer-readable medium of claim 16, wherein the second class of service is higher priority than the particular class of service.

19. The computer-readable medium of claim 14, further comprising instructions configured to cause the processor to re-evaluate whether said trunk port is still experiencing data traffic congestion and, if not, send a second message to the respective user-to-network interface associated with the selected communication path that instructs that respective user-to-network interface to reverse the limitation on transmission of data traffic of the particular class of service on the selected communication path.

\* \* \* \* \*